United States Patent [19]

Wenstrom

[11] 4,286,356
[45] Sep. 1, 1981

[54] MACHINE FOR REMOVING MEAT FROM PREPARED CRAB BODIES

[75] Inventor: Richard T. Wenstrom, Ellsworth, Me.

[73] Assignee: Sea Savory, Inc., Cambridge, Md.

[21] Appl. No.: 70,736

[22] Filed: Aug. 29, 1979

[51] Int. Cl.³ ............................................. A22C 29/02
[52] U.S. Cl. ........................................ 17/46; 17/51; 17/71
[58] Field of Search .................. 17/46, 48, 51, 71, 72, 17/73

[56] References Cited

U.S. PATENT DOCUMENTS

| 965,706 | 7/1910 | Greiner | 17/73 |
| 2,838,786 | 6/1958 | Ward | 17/71 |
| 3,249,962 | 5/1966 | Rossnan | 17/71 |
| 3,257,683 | 6/1966 | Rossnan | 17/71 |

FOREIGN PATENT DOCUMENTS 457475  6/1949  Canada ........................................ 17/71

Primary Examiner—Willie G. Abercrombie
Attorney, Agent, or Firm—Scrivener, Clarke, Scrivener and Johnson

[57] ABSTRACT

The disclosure is of a machine for removing the meat from the prepared body of a crab, lobster or other crustacean by means of a jet of compressed air.

5 Claims, 5 Drawing Figures

FIG. 3.
FIG. 4.
FIG. 5.
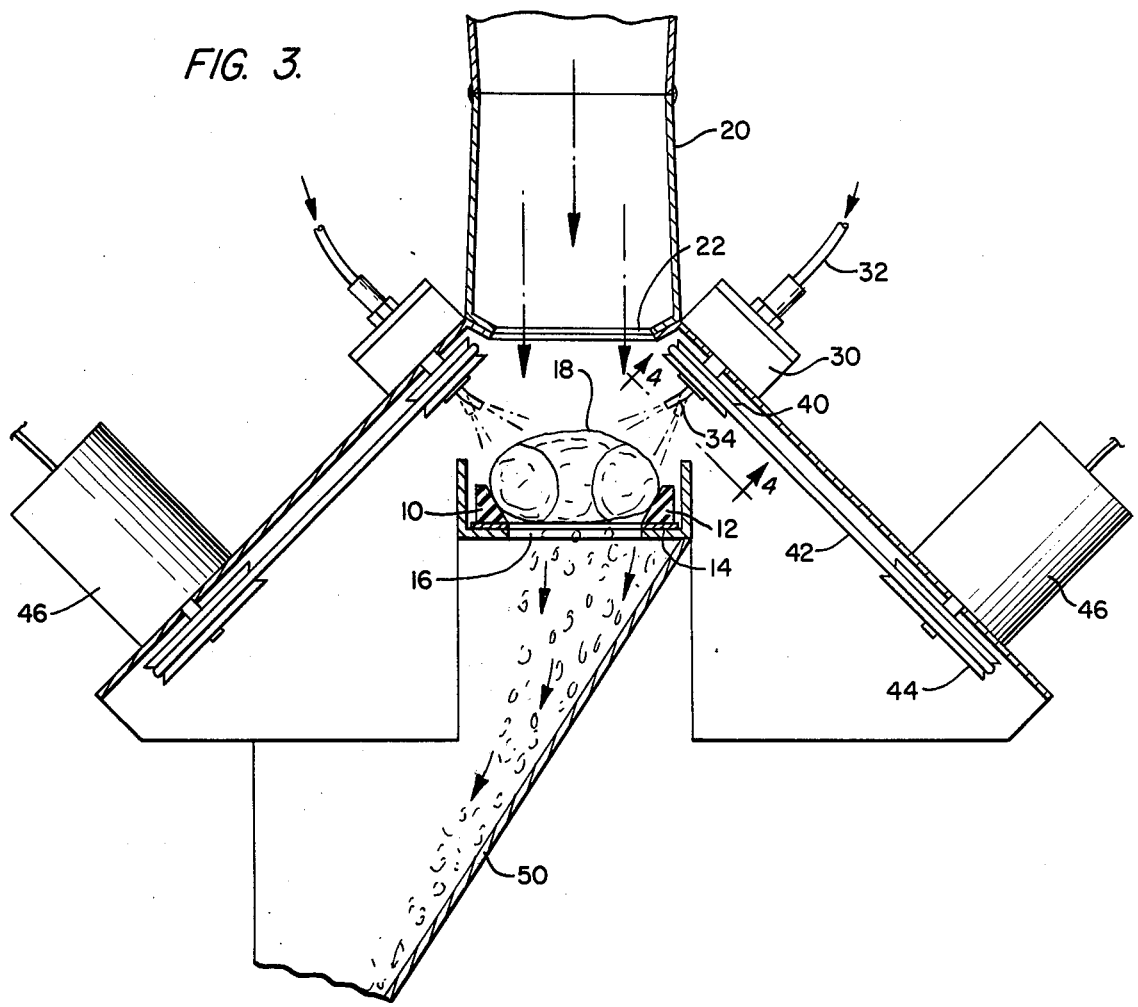
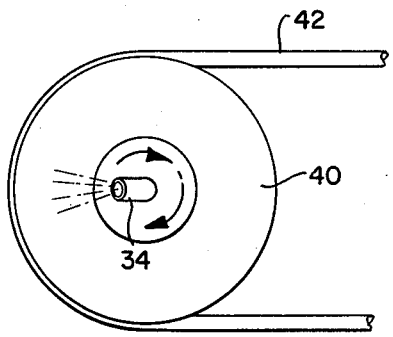
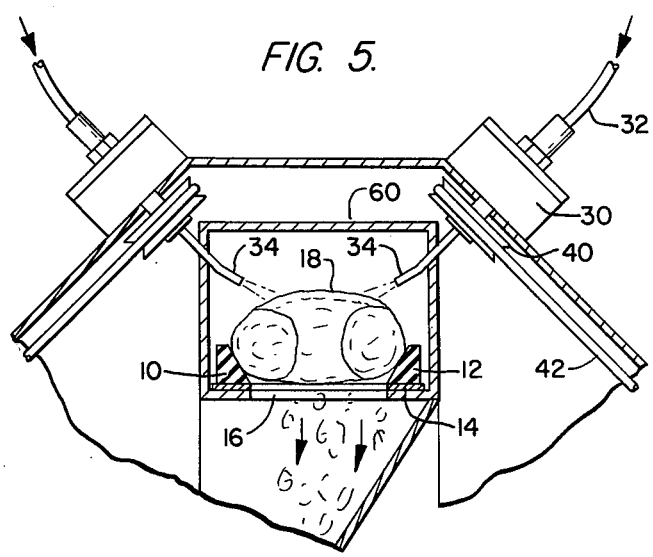

MACHINE FOR REMOVING MEAT FROM PREPARED CRAB BODIES

BACKGROUND OF THE INVENTION

The invention relates particularly to the recovery of meat from crabs, such as the common edible crabs of the Atlantic coasts of North and South America. The Atlantic crabs referred to includes the blue, rock, sand and other species, and the invention may also be utilized in the treatment of the Dungeness crabs of the Pacific coasts of the United States and Canada and crab species found in the North Sea of Europe and elsewhere and having body, leg, and claw conformation similar to those of the blue crab. It will be understood by those skilled in the relevant arts that while the invention is particularly related to the removal of meat from crabs it will also be useful in the removal of meat from the bodies of other crustacea, such as lobster, shrimp and crayfish, after suitable preparation to adapt them to the processing by the method and apparatus according to the invention.

In an operation preliminary to the practice of the invention the crabs are cooked and the legs and claws are then detached, the carapace, gills, mouth parts, apron, and visceral matter are removed in successive operations, and the stripped carcasses are ready to be subjected to the steps of the present invention method.

The use of air or another fluid under pressure in the general art of preparation of crustacea for use is known in such procedures as removal of meat from the shell of the tail of a shrimp (Martin U.S. Pat. No. 3,110,926), removal of the shell from the body of a shrimp (Abbott U.S. Pat. No. 2,546,414), removal of the meat from the shell of a shrimp (Jonsson U.S. Pat. No. 2,784,450 and Ingalls U.S. Pat. No. 3,758,921).

The removal of meat from a crab presents special problems, which are not solved by the fluid pressure means provided by the methods and apparatus of the patents referred to above, which are designed for specific use with certain crustacea other than crabs. However, it has heretofore been proposed to remove the meat from crabs by jets of air or other fluid under pressure and this has been accomplished by apparatus in which the nozzle supplying the air jet is held by the hand of the machine operator and is directed toward crab body, this being disclosed in the U.S. Pat. Nos. to Greiner No. 965,706, Range No. 1,385,951, Ward Nos. 2,838,786 and 2,903,737 and Rossnan No. 3,696,465. In addition, the use of suction to remove meat from crabs is disclosed in the U.S. Pats. to Rossnan Nos. Re. 26,136, 3,257,683 and 3,274,640. There are, of course, many prior art machines and methods for preparing crabs for subsequent meat removal, but these do not relate to the present invention which provides a new and improved method and apparatus for meat removal.

SUMMARY OF THE INVENTION

Meat is removed from the prepared body of a crab or other crustacean by subjecting the meat holding cavities of the body to the directed blast of an air jet and rotating the jet in a circle encompassing the area of the meat to be removed.

DESCRIPTION OF THE DRAWINGS

FIG. 3 is an enlarged view of the apparatus at the work station of the machine;

FIG. 4 is a view taken on line 4—4 of FIG. 3 showing the nozzle movement according to the invention, and FIG. 5 is an end view similar to parts of FIG. 3 showing a modified means provided by the invention for holding the prepared crab body in place at the work station.

DESCRIPTION OF THE INVENTION

Figure 1:
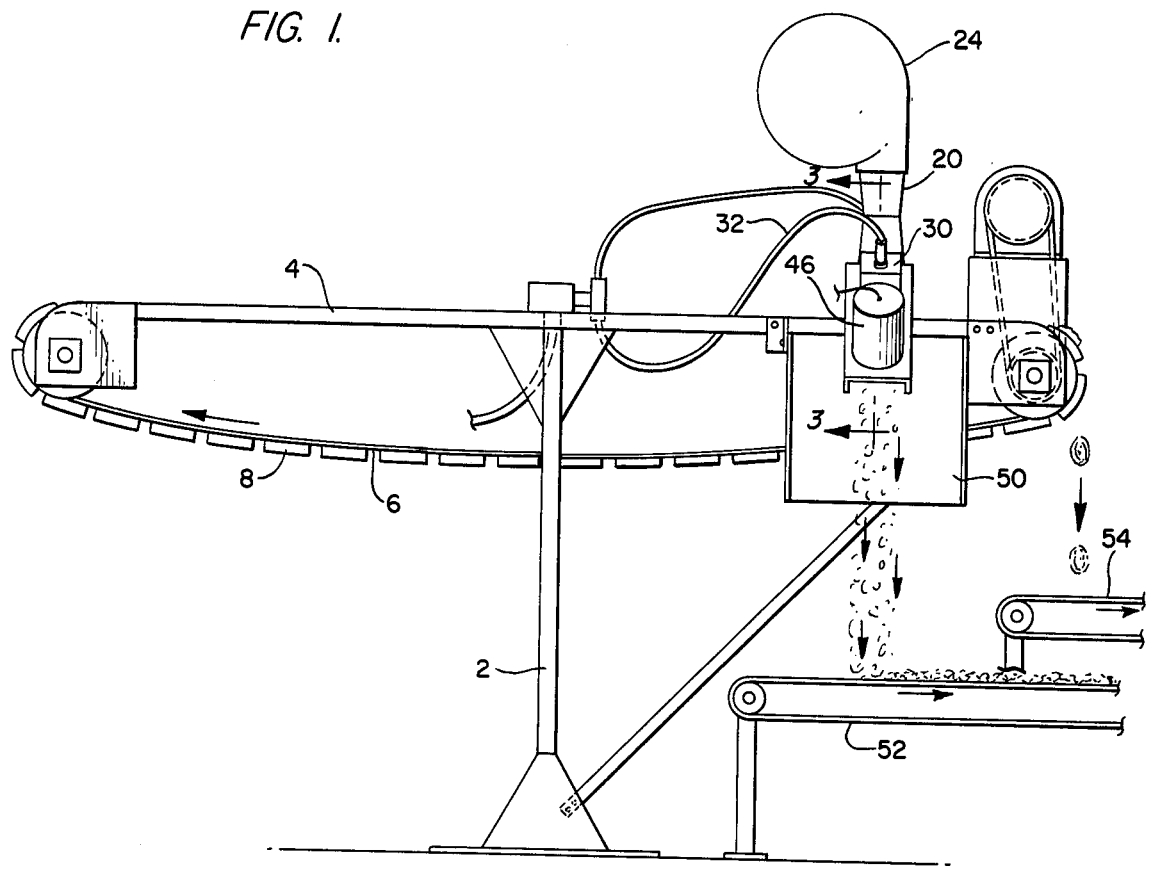
FIG. 1 is a side elevational view of a preferred form of machine provided by the invention for the practice of the method according to the invention.
Figure 2:
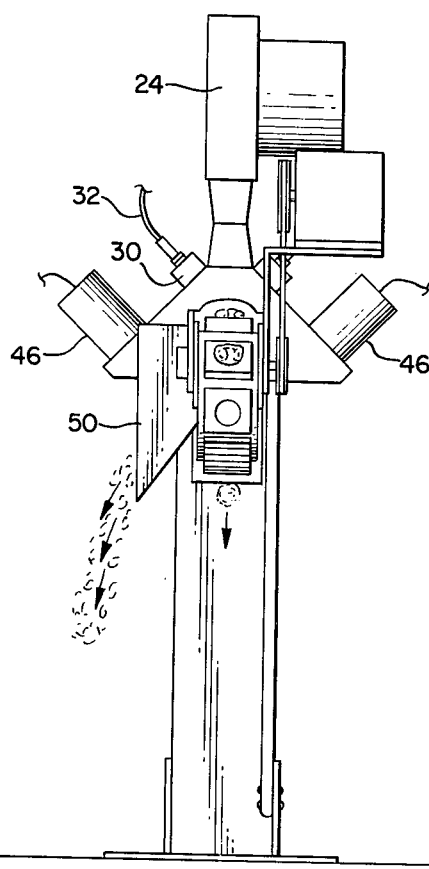
FIG. 2 is an end view of the machine taken from the right of FIG. 1.

A preferred embodiment of the machine provided by the invention is disclosed in FIGS. 1 to 4 of the drawings, and comprises a pedestal or other means 2 which supports at its upper end a horizontal framework 4 on which there is mounted for movement in an endless path a belt 6 having on its outer surface a plurality of supporting members 8 which are of such size and shape that each will receive the prepared body of a crab. Each supporting member 8 has upstanding side walls 10, 12 and a bottom 14 having an opening 16 therein which extends over substantially the entire central part of the support member. The endless belt and the support means carried thereby provide means for carrying a plurality of prepared crab bodies into and through a work station at which the meat is removed from the prepared body. For best results in the removal of meat, the body of the crab, prepared as heretofore described, is placed on a support in such a way that the bottom of the crab, which is the part normally below the visceral cavity, is placed uppermost above the two side parts of the body which have within them the cavities housing the meat.

Means are provided at the work station for holding each prepared crab body on the support member on which it rests. Such means comprise apparatus for directing onto each crab body arriving at the work station a downwardly directed blast of air which presses the crab body onto its support member. In the embodiment of the invention being described this means comprises a vertical duct or pipe 20 which is positioned above the endless belt at the work station and which has approximately the same cross sectional area as one of the support members 8, and has an open lower end 22 which is positioned just above the crab body and its holder at the work station. A suitably driven fan or impeller 24 may be connected to the pipe 20 at the upper end thereof and is operable to supply air under pressure through the opening 22 and onto the top of the prepared body within the work station. This holding effect is increased because, as stated above, the bottom of the crab, which is a solid plate, is presented to the downwardly directed blast of air, which therefore inpinges on this part of the body and creates a downward pressure holding the crab body firmly on its support.

Means are provided by the invention for removing the crab meat from the two parts of the prepared crab body at the work station, and as two of such means are provided one for each meat holding side of the crab body, and as these are identical, only one will be described in this specification.

This meat removal means comprises, broadly, means for directing onto each meat holding part of the prepared crab body from a position above and laterally outside the part, a jet of compressed air, and moving the outlet of the jet in a circular path adjacent and encompassing the area of the meat holding part. These means comprise a cylindrical housing 30 which is mounted on a fixed part of the work station above and laterally outside the belt 6 with its axis angularly disposed and directed toward the belt. A tube 32 passes axially through this housing and is connected at its outer end to a source of air under pressure, which is not shown. The inner end of this tube 34 extends outwardly from the housing 30 toward the crab body and terminates just above the body in a nozzle through which air under pressure is directed onto the body, thus providing an air jet impinging on the meat within the cavities of the body, through openings in the body caused by the removal of the legs and claws.

In further accordance with the invention the nozzle 34 is rotated in a circular path so that the air jet issuing from it moves in a circular path encompassing the area of the meat holding cavities of the crab body and adjacent, above and laterally outside the body and angularly directed toward it whereby meat removed from the body will be forced out of the cavities and through the opening 16 in the support member holding the crab body. In order to provide this rotational movement of the nozzle 34 the nozzle is rotatably and axially connected to the remainder of the tube 32 and its outer end part is formed at an angle to the axis of the housing 30 so that as the nozzle revolves its outer angular part describes a cone shaped path. This rotational movement is accomplished by mounting the inner end of the angle-shaped nozzle 34 in the axis of a rotatable pulley 40 which is mounted on housing 30 and is connected by endless belt 42 to the drive pulley 44 of an electric motor 46 on a fixed part of the machine at or adjacent the work station.

The movement of the endless belt 6 may be continuous or intermittent, but in either case crab meat blown from the cavities of the crab body at the work station drops through the opening in the bottom of the holder 8 and passes into a chute 50 from which it is removed in any suitable way, such as the endless belt 52. The empty crab body passes from the work station and drops from the endless belt 6 at the delivery end thereof and is removed in any suitable manner such as by falling on an endless belt 54.

In a second embodiment of the invention, which is disclosed in FIG. 5, alternative means are provided for holding each crab body on its holder, and it will be seen that this means, like the means disclosed in FIGS. 1 to 4, uses air pressure for accomplishing this result. In the embodiment of FIG. 5 all parts of the machine are the same as those of FIGS. 1 to 4 except that the means 20, 22, 24 which deliver air under pressure at the work station to hold the crab body on its holder is eliminated. In its place there is provided a cover 60 which, in combination with the support for the endless belt at the work station, provides an enclosed chamber for the work station excepting only the apertures in the chamber through which the endless belt, the holders and the crab bodies enter and leave the work station. The nozzles 34 extend through the side walls of this chamber and the parts of the nozzles which are within the chamber are angularly bent in the manner described above so that the outlet of each nozzle is rotated in a circular path which is above, adjacent and laterally disposed with respect to each meat holding part of the crab body, all in the manner and with the results described above.

The air jets which are discharged within the chamber build up the air pressure within the chamber and cause each crab body within the chamber to be held firmly on the holder.

I claim:

1. A machine for removing the meat from a crab body which has been prepared by removal of the carapace, claws, flippers and viscera leaving the two sections of meat separated by the visceral cavity and connected by the bottom shell comprising a work station, means for supporting a prepared crab body, means for moving the support below the work station with the prepared crab body hereon, and air jet means positioned above and outside the support means for directing air under pressure in a downward and inward direction toward both of the sections of crab meat, and means for rotating each the air jets in a circular path adjacent and encompassing the meat to be removed.

2. The machine according to claim 1, comprising in addition means at the work station for pressing the crab body downwardly on its support.

3. The machine according to claim 2, in which the pressing means comprises means for directing a stream of air downwardly onto the crab body.

4. The machine according to claim 2, in which the pressing means comprises an enclosure surrounding the air jet means.

5. The method of removing the meat from the prepared body of a crustacean such as a crab, which consists in directing jets of air in a defined circular path under pressure toward the meat within the prepared body and rotating the outlet of the jets in a predetermined circular path adjacent and encompassing the meat to be removed.

* * * * *